United States Patent
Peters et al.

(10) Patent No.: US 11,854,551 B2
(45) Date of Patent: Dec. 26, 2023

(54) HYBRID ARCHITECTURE FOR TRANSCRIPTION OF REAL-TIME AUDIO BASED ON EVENT DATA BETWEEN ON-PREMISES SYSTEM AND CLOUD-BASED ADVANCED AUDIO PROCESSING SYSTEM

(71) Applicant: Avaya Inc., Santa Clara, CA (US)

(72) Inventors: Matthew A. Peters, Redmond, WA (US); Robert E. Braudes, Erie, CO (US); Jeffrey L. Aigner, Seattle, WA (US)

(73) Assignee: Avaya Inc., Santa Clara, CA (US)

( * ) Notice: Subject to any disclaimer, the term of this patent is extended or adjusted under 35 U.S.C. 154(b) by 880 days.

(21) Appl. No.: 16/362,035

(22) Filed: Mar. 22, 2019

(65) Prior Publication Data

US 2020/0302934 A1 Sep. 24, 2020

(51) Int. Cl.
| | |
|---|---|
| *G10L 15/30* | (2013.01) |
| *G10L 15/26* | (2006.01) |
| *G10L 15/22* | (2006.01) |
| *H04L 65/60* | (2022.01) |
| *H04L 67/10* | (2022.01) |

(52) U.S. Cl.
CPC ............ *G10L 15/26* (2013.01); *G10L 15/22* (2013.01); *G10L 15/30* (2013.01); *H04L 65/60* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,150,689 B2 | 4/2012 | Beach et al. | |
| 8,234,141 B1 | 7/2012 | Flockhart et al. | |
| 8,370,142 B2 | 2/2013 | Frankel et al. | |
| 8,634,543 B2 | 1/2014 | Flockhart et al. | |
| 10,019,989 B2 | 7/2018 | Gauci | |
| 10,042,697 B2* | 8/2018 | Ahad | G06F 11/0751 |
| 10,224,057 B1* | 3/2019 | Chevrier | G10L 21/18 |
| 2017/0148036 A1* | 5/2017 | Klemm | G06Q 30/0201 |
| 2018/0174587 A1 | 6/2018 | Bermundo | |
| 2018/0349362 A1* | 12/2018 | Sharp | G06F 16/14 |
| 2019/0104094 A1* | 4/2019 | Albrecht | G10L 15/26 |
| 2019/0114395 A1* | 4/2019 | Lenchner | G06F 21/64 |
| 2019/0377546 A1* | 12/2019 | Malatesha | G10L 15/30 |
| 2020/0267259 A1* | 8/2020 | Behm | H04M 1/72475 |

OTHER PUBLICATIONS

Google; AI Machine Learning Products; "Cloud Speech-to-Text," n.d.; Retrieved Jul. 2, 2019 from https://cloud.google.com/speech-to-text/.
Virtustream; "The right partner for SAP applications in the cloud"; n.d.; Retrieved Jul. 2, 2019 from https://www.virtustream.com/solutions/solutions-for-sap.

* cited by examiner

*Primary Examiner* — Seong-Ah A Shin
(74) *Attorney, Agent, or Firm* — Stevens & Showalter LLP (57) ABSTRACT

Transcribing portions of a communication session between a user device and an on-premises device of an enterprise includes receiving, by a computer located remotely from the on-premises device, a media stream of the communication session from the on-premises device and receiving, by the computer, at least one event associated with the media stream from the on-premises device. Furthermore, the computer determines a portion of the media stream to transcribe based on the at least one event and transcribes the portion of the media stream.

18 Claims, 9 Drawing Sheets

HYBRID ARCHITECTURE FOR TRANSCRIPTION OF REAL-TIME AUDIO BASED ON EVENT DATA BETWEEN ON-PREMISES SYSTEM AND CLOUD-BASED ADVANCED AUDIO PROCESSING SYSTEM

BACKGROUND

The present disclosure relates generally to audio transcription of contact center interactions, and, more particularly, to a hybrid cloud-based approach to such transcriptions.

Traditional contact centers focus on agents interacting with customers by listening to what the customer says. There are also call recording solutions, such as those available from Verint that provide files of the audio that can be processed for off-line transcription. Recently some systems have started to do near-real-time transcription, such as the Avaya Conversational Intelligence (ACI) program. ACI utilizes events related to a call, such as when multiple parties have answered, to determine what portions of the call should be transcribed. However, these systems have both the base system and the transcription processing located in either the cloud or on-premises. There is a need, however, on having a hybrid system, where the core is on-premises in the enterprise and the transcription processing is a service in the cloud.

BRIEF SUMMARY

One aspect of the present invention relates to a system for transcribing portions of a communication session between a user device and an on-premises device of an enterprise, the system remotely located from the on-premises device. In particular, the system includes a memory device, storing executable instructions and a processor in communication with the memory device. Thus, the processor when executing the executable instructions: a) receives a media stream of the communication session from the on-premises device; b) receives at least one event associated with the media stream from the on-premises device; c) determines a portion of the media stream to transcribe based on the at least one event; and d) transcribes the portion of the media stream.

Another aspect of the present invention relates to a method for transcribing portions of a communication session between a user device and an on-premises device of an enterprise. This method includes receiving, by a computer located remotely from the on-premises device, a media stream of the communication session from the on-premises device and receiving, by the computer, at least one event associated with the media stream from the on-premises device. The method continues with the steps of determining, by the computer, a portion of the media stream to transcribe based on the at least one event; and transcribing, by the computer, the portion of the media stream.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communications may be by way of any communications medium such as, but not limited to, a telephone call, email, instant message, web chat, and the like. The terms "user" and "customer" denote a party external to the contact center and are used herein to refer to the other party to a contact or a communications session. A user or customer may include, for example, a person having a commercial relationship with the contact center or with a business represented by the contact center.

For each contact received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure may be separately claimed.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

Figure 1:
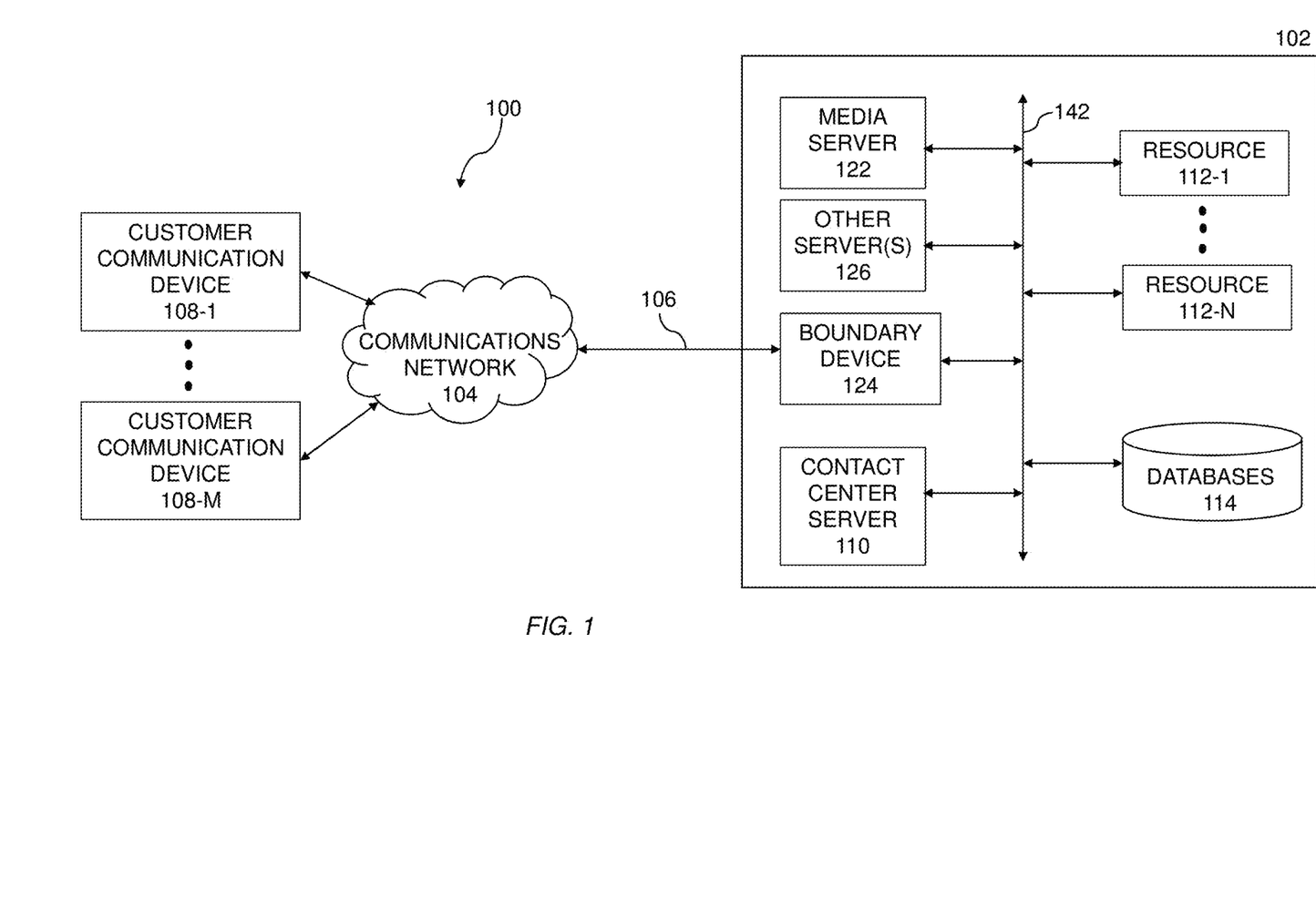
FIG. 1 illustrates a communications system architecture in accordance with the principles of the present disclosure.

FIG. 1 shows an exemplary embodiment of a communications system 100 according to the present disclosure. The communications system 100 may comprise a communications network 104 connecting components of a contact center 102 via a communications link 106 to one or more customer communication devices 108-1 to 108-M, where M is an integer, M≥1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communication medium or collection of communication media and may use any type of protocols to transport messages between endpoints. The communications network 104 may be packet-switched and/or circuit-switched and may include wired and/or wireless technologies.

The contact center 102 may comprise, for example, a boundary device 124, a central contact center server 110, a media server 122, one or more other servers 126, and a set of data stores or databases 114. The additional servers 126 may include, for example, an Interactive Response unit (IVR), a voice portal, a video call server, an email server, and the like. Some or all of the components of the contact center 102 may be interconnected by an internal network 142 such as a local area network (LAN) or WAN. One or more of the components of the contact center 102 may also be connected via one or more optional communications links (not shown) to one or more other components of the contact center 102.

Although depicted as separate servers and/or applications that are co-located with one another, it should be appreciated that such a configuration of components is not required. For example, some or all of the functions depicted in FIG. 1 may be co-hosted and/or co-resident on a single server and/or processor, e.g., the contact center server 110, and/or two or more of the contact center 102 components may be distributed and connected to one another over the communication network 104, with the communications between these components may be secured with tunneling protocols or a Virtual Private Network (VPN, not shown). In addition, although one central contact center server 110 is depicted in FIG. 1, two or more servers 110 may be provided in a single contact center 102 or across multiple separate LANs 142 owned and operated by a single enterprise, but separated by the communications network 154. Likewise, two or more media servers 122 may be provided in the contact center 102. In configurations where the contact center 102 includes two or more servers 110 and/or media servers 122, each server 110, 122 may comprise similar functionality, but may be provisioned for providing its features to only a subset of all contact center users.

A customer associated with a customer communication device 108 may utilize the device 108 to generate and transmit a communication, such as a telephone call, an email message, an instant message (IM), an SMS message, etc., over the communications network 104, which is received as a contact at the contact center 102. The contact may be received at the boundary device 124, which maintains a secure separation between the communication network 104 and the internal network 142 and facilitates communications between the customer communication device 108 and the contact center 102. The boundary device 124 may include the functionality of one or more of a switch, a computer-telephony integration (CTI) interface, a SIP gateway, a security gateway, a firewall, a router, or the like. A boundary device 124 comprising a SIP gateway may, for example, connect with one or more SIP trunks from the communications network 104 and split incoming aggregate SIP traffic into individual SIP sessions and aggregate the individual outbound SIP sessions. The boundary device 124 may be implemented as hardware such as via an adjunct processor (as shown) or as a chip in the contact center server 110 (not shown).

Following receipt at the contact center 102, a contact object is instantiated for each contact as described herein and the contact objects are distributed to a plurality of resources 112-1 to 112-N, wherein N is an integer, N≥1 (referred to collectively herein as resource 112). Each resource 112 represents a processing resource of the contact center 102 and may comprise completely automated resources (e.g., processors, servers, or the like), human resources utilizing communication devices (e.g., human agents utilizing a computer, telephone, laptop, etc.), or any other resource known to be used in a contact center 102. In some embodiments, contact objects may be assigned to the IVR (not separately labeled), a voice portal (not separately labeled), or other component of the contact center 102 for automated customer service processing prior to or simultaneous with assigning the contact object to a human resource (e.g., a contact center agent). For example, the voice portal and the IVR may work together to provide IVR services to the contacts.

Each resource 112 may be associated with a resource communication device (not shown), which may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communications device, and/or any other suitable communications device. These packet-switched devices may be SIP compatible. The resource communication device may also comprise circuit-switched devices that each correspond to one of a set of internal extensions and may include, for example, wired and wireless telephones, voice messaging and response units, traditional computer telephony adjuncts, and any other suitable communications device.

Figure 2:
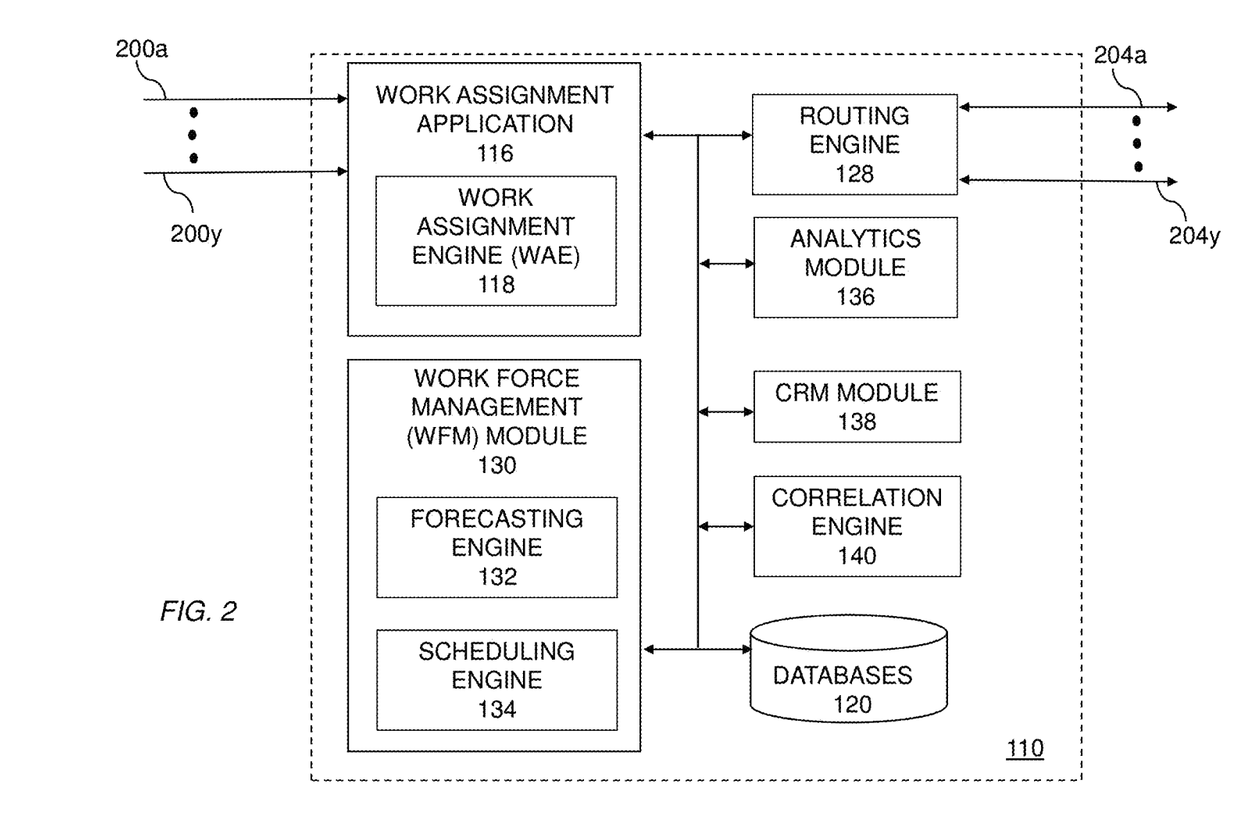
FIG. 2 illustrates aspects of a contact center server in accordance with the principles of the present disclosure.

With reference to FIG. 2, the contact center server 110 may further comprise a work assignment application 116, a routing engine 128, a work force management (WFM) module 130, an analytics module 136, a customer relationship management (CRM) module 138, a correlation engine 140, and one or more database(s) 120. Although each of these functions is depicted in FIG. 2 as residing on the contact center server, it should be appreciated that one or more of the functions, such as the routing engine 128, may reside elsewhere and/or be executed by another server/engine.

Each contact object may comprise one or more work items and generally comprises at least a request for a resource 112. The format of each work item may depend upon the capabilities of the communication device 108 and the format of the communication. In particular, work items are logical representations within the contact center 102 of work to be performed in connection with servicing a particular contact received at the contact center 102 (and more specifically at the work assignment application 116). Work items may be received at the work assignment application 116 from the customer communication devices 108 via one or more customer communications lines or channels 200a to 200y (which may be one or more trunks, phone lines, etc.) and maintained at the work assignment application 116, a switch or server connected to the work assignment application 116, or the like until a resource 112 is assigned to the work item. The work assignment application 116 comprises a work assignment engine 118 that enables the work assignment application 116 to make intelligent routing decisions for work items. As used herein, assignment and/or routing of a contact or contact object to a resource and association of contact attributes with the contact or contact object are intended to be synonymous with assignment and/or routing of the work item(s) associated with the contact or contact object to a resource and association of contact attributes with the work item(s).

The work assignment engine 118 may determine which of the plurality of processing resources 112 is qualified and/or eligible to receive the work item and further determine which of the plurality of processing resources 112 is best suited to handle the processing needs of the work item. In situations of a work item surplus, the work assignment engine 118 may also determine an optimal assignment of a work item resource to a particular resource, e.g., resource 112-1. In some embodiments, the work assignment engine 118 may be configured to achieve true one-to-one matching by utilizing bitmaps/tables and other data structures. Following assignment of the resource 112-1 to a work item, the work assignment application 116 passes the work item to the routing engine 128 to connect the customer communication device 108 that initiated the communication with the assigned resource 112-1 via one of a plurality of resource communications lines 204a to 204y (which may be a voice-and-data transmission line such as a LAN 142 and/or a circuit switched voice line).

The WFM module 130 may be configured to manage the workforce of the contact center 102 (namely the human resources 112). The WFM module 130 may comprise a variety of functionalities, such as a forecasting engine 132 and a scheduling engine 134, that operate together to achieve optimal management of the workforce. The forecasting engine 132 may monitor current work item volume, current resource availability/utilization, past work item volume, past resource availability/utilization, estimated wait times, service levels, and other objectives and provides a forecast or estimate of the work item volume and required staffing levels in the contact center 102 for a desired shift period. For example, the forecasting engine 132 may be configured to monitor one or more Service Level Agreements (SLAs) between the contact center 102 and one or more clients or customers of the contact center 102 to ensure compliance with the applicable SLA(s).

The scheduling engine 134 uses the information provided by the forecasting engine to schedule human agents, e.g., resources 112, to work in the contact center 102. Additionally, the forecasting engine 132 may automatically identify future resource availability issues (in the short-term or long-term) and notify the scheduling engine 134, thereby enabling the scheduling engine 134 to adjust the scheduling of resources 112 as necessary. In some embodiments, the forecasting engine 132 is capable of analyzing prior and current contact center performance to determine if the contact center 102 will require more or less resources 112 at any particular time, e.g., the beginning or end of a calendar month. The scheduling engine 134 may also be configured to monitor schedule adherence, social media activity, and the like, and the WFM module 130 may enable shift bidding, schedule adjustments, work-at-home resource re-scheduling, and the like.

The analytics module 136 may be utilized to track trends and generate one or more reports that indicate agent performance and overall performance of the contact center 102. In some embodiments, the analytics module 136 may be configured to pull data stored in one or more databases 114, 120 and prepare the data in a human-readable format. The database(s) 114, 120 may be configured to store information about any or all components of the contact center 102 such as statistics related to the WFM module 130 (e.g., resource utilization, compliance with SLA agreements, compliance with objectives, etc.), resource performance statistics (e.g., Key Performance Indicators (KPIs)), and statistics related to the WAE 118 (e.g., decisions per time period, successful routing decisions, estimated wait time, etc.). Advantageously, the analytics module 136 may be configured to run one or more reports for predefined data automatically at predefined intervals. The analytics module 136 may also be enabled to run ad-hoc reports based on inputs received from a contact center administrator or manager. Further still, the analytics module 136 may be configured to run reports in response to a predetermined event or series of events occurring in the contact center 102.

The CRM module 138 may be configured to collect and manage historical customer information, current customer information, information related to interactions between a customer and a contact center 102, customer preferences, customer purchase history, customer return history, customer aliases (e.g., in social media networks), and the like. Such information may be stored and maintained in one or more of the database(s) 114, 120. The CRM module 138 may be utilized to help the contact center 102 provide a more robust and personalized customer service experience. In some embodiments, the CRM module 138 may retrieve desired CRM information from the database(s) 114, 120 to enable one of the resources 112 to more efficiently process a work item for a returning or known customer. For example, when a work item is received in a contact center 102 and the work item is associated with a customer having historical information stored as CRM information in one of the databases 114, 120, the CRM module 138 may retrieve some or all of the CRM information and provide the retrieved information to a resource 112, thereby enabling the resource 112 to provide a more personalized service to the customer.

Although some embodiments are discussed with reference to a client-server architecture, it is to be understood that the principles of the present disclosure apply to other network architectures. For example, the present disclosure applies to peer-to-peer networks, such as those envisioned by SIP. In the client-server model or paradigm, network services and the programs used by end users to access the services are described. The client side provides a user with an interface for requesting services from the network, and the server side is responsible for accepting user requests for services and providing the services transparent to the user. By contrast, in the peer-to-peer model or paradigm, each networked host runs both the client and server parts of an application program. Additionally, the disclosure does not require the presence of packet- or circuit-switched networks.

In some embodiments, the contact center server 110 and its various functionalities may be configured to administer and make work assignment decisions in a queueless contact center, as described in U.S. Pat. No. 8,634,543, the entire contents of which is hereby incorporated herein by reference.

In other embodiments, the server 110 may be configured to execute work assignment decisions in a traditional queue-based (or skill-based) contact center, as described in U.S. Pat. No. 8,234,141, the entire contents of which is hereby incorporated herein by reference. Skill-based contact centers may maintain a resource profile, which includes information related to each resource's skills, level(s) of skill expertise, and training, as well as metrics associated with a plurality of work items serviced by the resource for each resource skill (e.g., contact type, duration, and resolution, ratings from the customer and/or a supervisor, etc.). The resource profiles may be stored, for example, in one or more contact center database(s) (e.g., 114, 120 in FIGS. 1 and 2). This resource information is used to assign each resource to one or more skill groups or resource queues (not shown). When a new contact is received at a skill-based contact center, information about the contact is determined, such as the customer's identity and current needs, customer value, and the resource skill that is required for the proper handling of the contact, and this information, along with additional data such as current contact center queue lengths, is used to assign each new contact to a work item queue (not shown). Some of the information related to the contact may be maintained in a customer profile, which may also be stored, for example, in one or more contact center database(s) (e.g., 114, 120 in FIGS. 1 and 2). Contacts are assigned to resources based on a comparison of the resource skill required to service the contact and the skillset(s) of each resource.

In further embodiments, the server 110 and its various functionalities are configured to execute work assignment decisions in an attribute-based contact center, such as a contact center using the Avaya Oceana™ Solution. Similar to a skill-based contact center, attribute-based contact centers gather information about customers and assign each contact to a resource based on matching between customer and resource data. However, attribute-based matching provides a match based on a plurality of individual attributes of the contact and the resource, as opposed to matching based on a single "skill" assigned to the contact in a traditional skill-based setting. Attribute-based matching provides more details about the contacts and delivers a greater degree of granularity than traditional skill-based matching, which permits more accurate forecasting of future needs.

In an attribute-based contact center, a list of contact attributes is assigned to, or associated with, each incoming contact, in which the attributes describe the optimal resource for handling the contact. The contact attributes may include real-time or current information related to the present communication, such as a type of assistance required (sales, support, etc.), channel type (voice, email, etc.), a current customer mood or behavior (as identified using, for example, detection of certain keywords, repeated clicking or tapping, etc.), and the like. The contact attributes may also include historical or contextual data related to one or more previous communications with the customer, such as a preferred language, a preferred region for resource location, a customer priority, and the like. The contextual data may be combined from multiple communications channels and/or communications sessions and may be stored in the customer profile. Information related to the attributes of each resource (e.g., languages spoken, geographic location, personality type, etc.) may similarly be stored in a resource profile. The list of contact attributes is compared to the unique combination of attributes assigned to each resource, and the contact is routed to the most suitable resource based on a matching combination of attributes. Matching based on individual attributes ensures that each incoming contact is assigned to the most suitable resource, thereby improving first call resolution. Attribute-based matching also allows the contact center to more accurately anticipate the volume and type of future incoming contacts and to forecast the required staffing levels.

Figure 3:
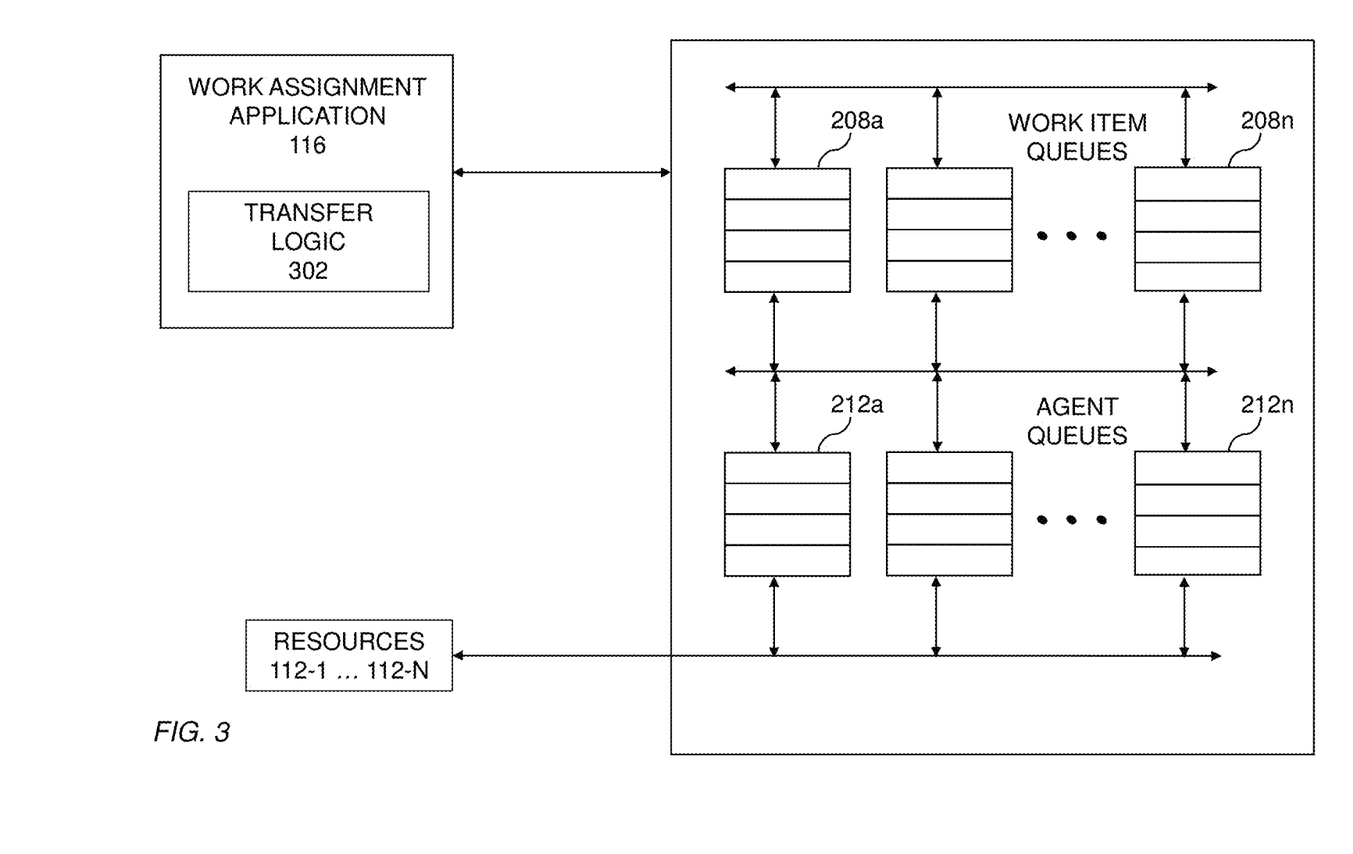
FIG. 3 illustrates a conceptual view of the connectivity of the different entities of the contact center in accordance with the principles of the present disclosure.

As may be seen in FIG. 3, included among the data stored in the server 110 (e.g., database 120 or database 114) can be a set of work item queues 208$a$-$n$ and a separate set of agent queues 212$a$-$n$. Each work item queue 208$a$-$n$ corresponds to a different set of agent skills, as does each agent queue 212$a$-$n$. Conventionally, work items are prioritized and are either enqueued in individual ones of the work item queues 208$a$-$n$ in their order of priority or in different ones of a plurality of work item queues 208$a$-$n$ that correspond to a different priority. Likewise, each agent's skills are prioritized according to his or her level of expertise in that skill, and agents are either enqueued in individual ones of agent queues 212$a$-$n$ in their order of expertise level or in different ones of a plurality of agent queues 212$a$-$n$ that correspond to a skill and each one of which corresponds to a different expertise level.

In some embodiments, the work assignment application 116 can operate such that contacts incoming to the contact center are assigned to different work item queues 208$a$-$n$ based on a number of predetermined criteria, including customer identity, customer needs, contact center needs, current contact center queue lengths, customer value, and the agent skill that is required for the proper handling of the contact. Agents who are available for handling work items are assigned to agent queues 212$a$-$n$ based on the skills that they possess. An agent may have multiple skills, and hence may be assigned to multiple agent queues 212$a$-$n$ simultaneously. Furthermore, an agent may have different levels of skill expertise (e.g., skill levels 1-N in one configuration or merely primary skill levels and secondary skill levels in another configuration), and hence may be assigned to different agent queues 212$a$-$n$ at different expertise levels.

In one configuration, the contact center may be operated by a contract operator, and each of the work item queues 208$a$-$n$, and possibly each of the agent queues 212$a$-$n$, corresponds to a different client. Each client may have a separate service level agreement or other type of performance measurement agreement with the contract operator regarding performance expectations, goals, requirements or specifications for the client's respective queue(s). The service level agreement may set forth penalties, such as financial penalties, for failing to comply with the service level agreement's requirements.

Figure 4:
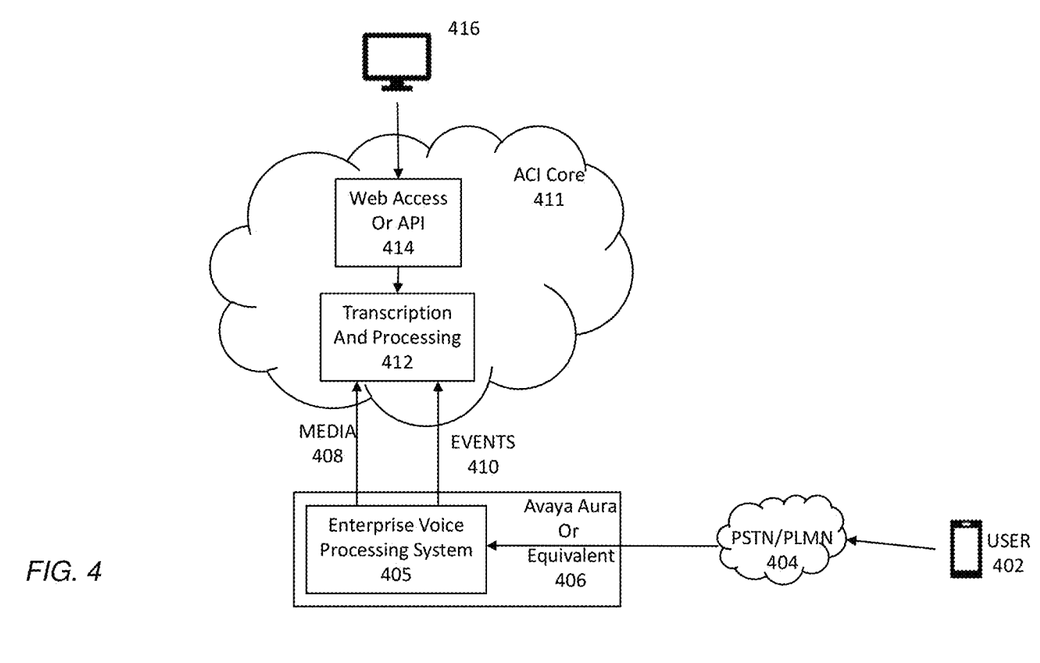
FIG. 4 illustrates a hybrid transcription service architecture in accordance with the principles of the present disclosure.

The invention in accordance with the principles of the present disclosure relates to a shared transcription service in the cloud that is shared by multiple on-premises enterprise-based systems that efficiently use call events to determine which portions of a call are relevant. There are two systems that co-exist in the invention, a voice processing system such as Avaya Aura® on-premises at an enterprise, and a cloud-based transcriptions system such as depicted in FIG. 4.

Figure 5:
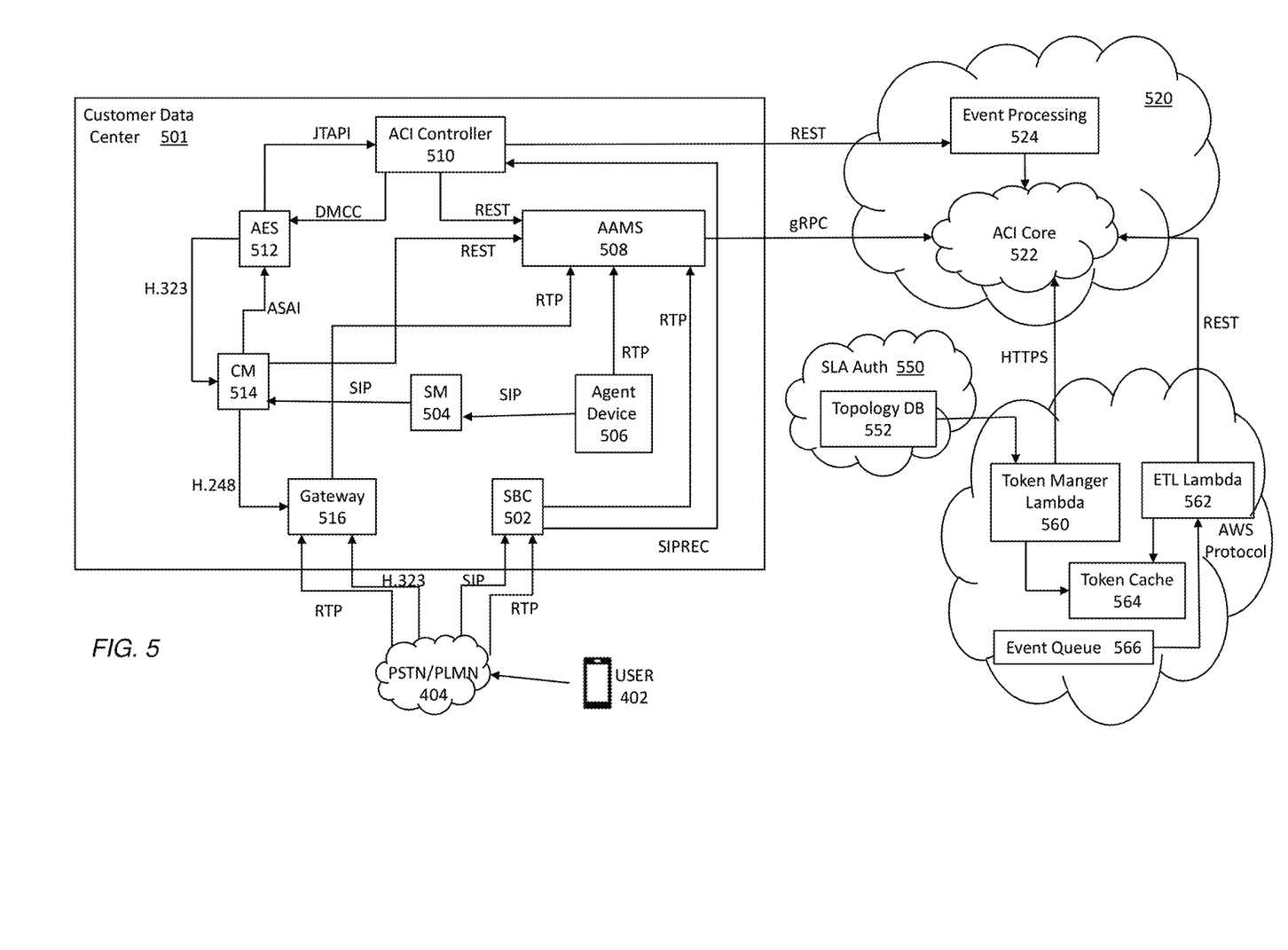
FIG. 5 illustrates one example implementation using a secure communication channel of a hybrid transcription service in accordance with the principles of the present disclosure.

In the on-premises system, a customer call in, say to a contact center that is staffed by agents, although this could also be an Interactive Voice Response (IVR) system or any other communication with human or synthesized voice. There are several possible architectures that may implement a hybrid architecture—the key is sending both media and state change events that may be correlated to gain efficiencies in processing. As the call proceeds, events are generated such as call answered, participant entered, participant left, call transferred, call placed on/off hold, etc. Additionally there are individual media streams for each participant on the call; in a simple example there are two media streams, the customer and the agent. However, in an omni-channel contact center there may be multiple media streams involving video, email, and various messaging formats as well. The call events are associated with the media, and are sent to the cloud transcription service for processing; in parallel the media and events may be cached in the enterprise in case the network connection to the cloud is dropped or has throughput below a specified threshold. The connection between the Enterprise and the Cloud can include a direct connection, as shown in FIG. 5, or may utilize a VPN, such as in FIG. 6 or FIG. 7.

As the call data is received by the cloud transcription service, the events can be analyzed to determine which portions of the media stream should be transcribed. Events can also be used to identify attributes of the media stream such as the language, dialect, etc. The events that are used to make this determination and the associated actions may be configurable. Once a call segment has been successfully transcribed, the transcription can be made available in near-real-time for further processing, either by the Enterprise system (e.g., to bring in a supervisor, suggest a line of questions from the agent to the customer, etc.), or to additional processing systems. Once the entire call has been processed the on-premises cache can be notified to optionally delete the cached data.

Utilizing a multi-tenanted cloud service for transcription and sending information back to the on-premises system, coupled with the efficiencies gained by using the associated events, yields a better customer experience by having the results of the near-real-time transcription available during the call to assist the agent.

Similar gains may be achieved in other voice-based domains, including but not limited to self-service systems. The integration of real-time events with the media stream to go from multiple enterprises to a cloud-based transcription service provides efficiencies that enable the service to enhance the overall experience beyond what can be accomplished without the incorporation of the event data.

Referring to FIG. 4, a user 402 can initiate contact with a contact center or call center 406 via a land-based or mobile network 404. Typically, the contact center 406, as described above, will comprise a voice processing system 405 in which the user 402 will engage in a communication session with live or automated agents of the enterprise. During this interaction with the enterprise 406, there will be a media steam 408 along with events 410 that correlate to the media stream 408. As used herein, the media stream 408 can include multiple media streams such as the media stream associated with the user 402, the media stream associated with the enterprise agent, and other media streams that may be part of the user's interaction with the enterprise. Events related to these media streams can be varied but can, for example, include events such as: Participant Enter, Participant Exit, Subconference created (for a group conversation, a subset forms a "splinter" discussion that is separate from the initial meeting), Meeting Extended (would be useful if we dynamically assign resources to a given server based on expected duration), Bot/Program Enter (this would be good to include in a transcript, along with any related metadata), Bot/Program Exit, Language Changed, Personal Data Start/Stop (when personal data is being requested that should be redacted. For example, a credit card number is being requested).

The media stream 408 and the events information 410 is communicated from the on-premises contact center 406 to a cloud-based 411 transcription and processing service 412. In accordance with the principles of the present disclosure, the portions of the media stream 408 which are to be transcribed by the service 412 is controlled by the events information 410. In particular, when certain events occur, the transcription of the media stream can be started, stopped or resumed. Thus, the transcription and processing service 412, receives a media stream and its associated events. The events are associated with different time occurrences within the media stream. The transcription and processing service 412 analyzes an occurrence of an event and determines, based on that event, whether or not to transcribe a portion of the media stream. The events and media stream are collected via on-premises equipment of the enterprise but are transmitted to a remotely located cloud-based system that includes the transcription and processing service 412. Accordingly, legacy and conventional equipment of the enterprise can continue to be utilized but the advantages of a cloud-based transcription service can be realized as well.

As one example, an interface 414 can be provided that allows a user 416 access to the output of the transcription and processing service 412. For example, the Avaya Conversational Intelligence (ACI) can perform artificial intelligence (AI) based analysis of a transcribed interaction and provide real-time feedback through the interface 414 to an agent or supervisor of an on-going contact with the enterprise 406. The user device 416 may also provide system access to an administrator or other enterprise personnel that can monitor the ACI core 411 or configure components of the ACI core 411.

One alternative, to the above described system is that the transcription and processing service 412 may utilize a third-party transcription service. In this alternative, the events are analyzed such that a determination is made whether or not to send a portion of the media stream to the third-party transcription service. Those portions of the media stream that are sent to the third-party transcription service will be transcribed and then returned to the ACI core 411 by the third-party transcription service. Not all portions of the media stream are necessarily sent to the third-party transcription service and, thus, the events associated with the media stream still control what portions of the media stream are transcribed and what portions are not.

The functionality illustrated in FIG. 4 can, for example, be implemented in a variety of different ways. In general, one implementation, as shown in FIG. 5, can communicate with the cloud-based components in a direct manner while in FIGS. 6-9 a more secure connection such as a VPN or software-define WAN can be utilized. In either case, the existing enterprise contact center systems are combined with a cloud-based transcription service to provide a hybrid system that takes advantage of existing infrastructure but augments it with the cloud-based services.

In FIG. 5, a user 402 communicates with the contact center 501 through a network 404. The incoming contact may be through a packet-based network and utilize a session border controller (SBC) 502 or through a more traditional network and utilize a gateway 516. As an example, the contact center can utilize the Avaya Aura system but the present invention is not limited to that particular system. The Aura system can include functionality, for example, such as a communication manager 514 and Application Enablement Services (AES) 512 to process incoming contacts.

The present disclosure can be utilized with regard to incoming contacts to a contact center as well as outgoing contacts. However, handling of an incoming contact is described below merely by way of example. Also, handling of a packet-based contact (e.g., a SIP-based contact) is described below, as well, but the principles of the present disclosure apply equally to contacts utilizing the H.323 and H.248 protocols.

An incoming contact reaches the SBC 502 which initiates a SIP session through the session manager (SM) 504. Also, a SIP record message is communicated to a controller 510. The SIP record message identifies a media stream (e.g., RTP stream) to record and a "logical" recorder of that stream. The controller 510 binds a particular recorded media stream (or media streams) with a particular series of events associated with that media stream. The recorded media stream can include RTP-based media streams from the devices associated with the user 402 and an agent 506 with which the user 402 is communicating.

An on-premises media server 508 can transform the RTP-based media streams into a protocol (e.g., gRPC) that can be used by a cloud-based 520, real-time transcription service such as Google Cloud Speech-to-Text. In addition to transmitting the media stream to the cloud, the controller 510 can transmit events associated with that media stream to the cloud 520 as well. Based on the events, an event processing module 524 can control which parts of the media stream are transcribed to be analyzed by the ACI core 522. One of ordinary skill will recognize that the ACI core 522 is just one example of an AI based analysis engine of a transcribed contact session that can be utilized by an enterprise in accordance with the principles of the present disclosure. As used herein, the term "real-time" is meant to encompass "near real-time" well. The term is meant to convey that whatever the processing that is occurring in real-real time involves, it is performed in a manner that allows the agent or the system to affect the communication session while the communication session is occurring. Post processing and non-real-time processing can also be utilized within the scope of the present disclosure.

In the example environment of FIG. 5, the events associated with a media stream can be determined through the session manager 504 (for SIP-based contacts), the communication manager 514, and the AES 512. For example, the different events can be readily recognized from standard SIP messages that announce different events during a communication session. A protocol such as JTAPI, for example, can be used to communicate the various events associated with a media stream.

For completeness, security and authentication modules are depicted in FIG. 5 but are conventional in nature in order to restrict access to the information available from the ACI core 522. SLA Auth module 550 includes a topology database 552. Additional security and authentication modules include a token manager lambda 560, an ETL lambda 562, and a token cache 564. As shown, an event queue 566 can also be included.

In FIG. 5, example protocols are shown for how the different functional elements can communicate with one another. These protocols are provided merely by way of example and one of ordinary skill will recognize that other protocols can be substituted without departing from the scope of the present disclosure. Similarly, some of the functional elements of FIG. 5 have been described using labels that conform to how Avaya has commercially implemented these elements such as, for example, ACI, AES, CM, AAMS, SBC, SM, etc. The respective functionality embodied in each of these elements is well known and understood; thus, identifying them by their commercial name is meant to concisely convey to one of ordinary skill all of the functionality provided by such elements as would be known to one of ordinary skill in this field of endeavor.

FIGS. 6-9 implement similar functionality to that of FIG. 5 but include a more secure communication configuration between the on-premises equipment and the cloud-based services.

Figure 6:
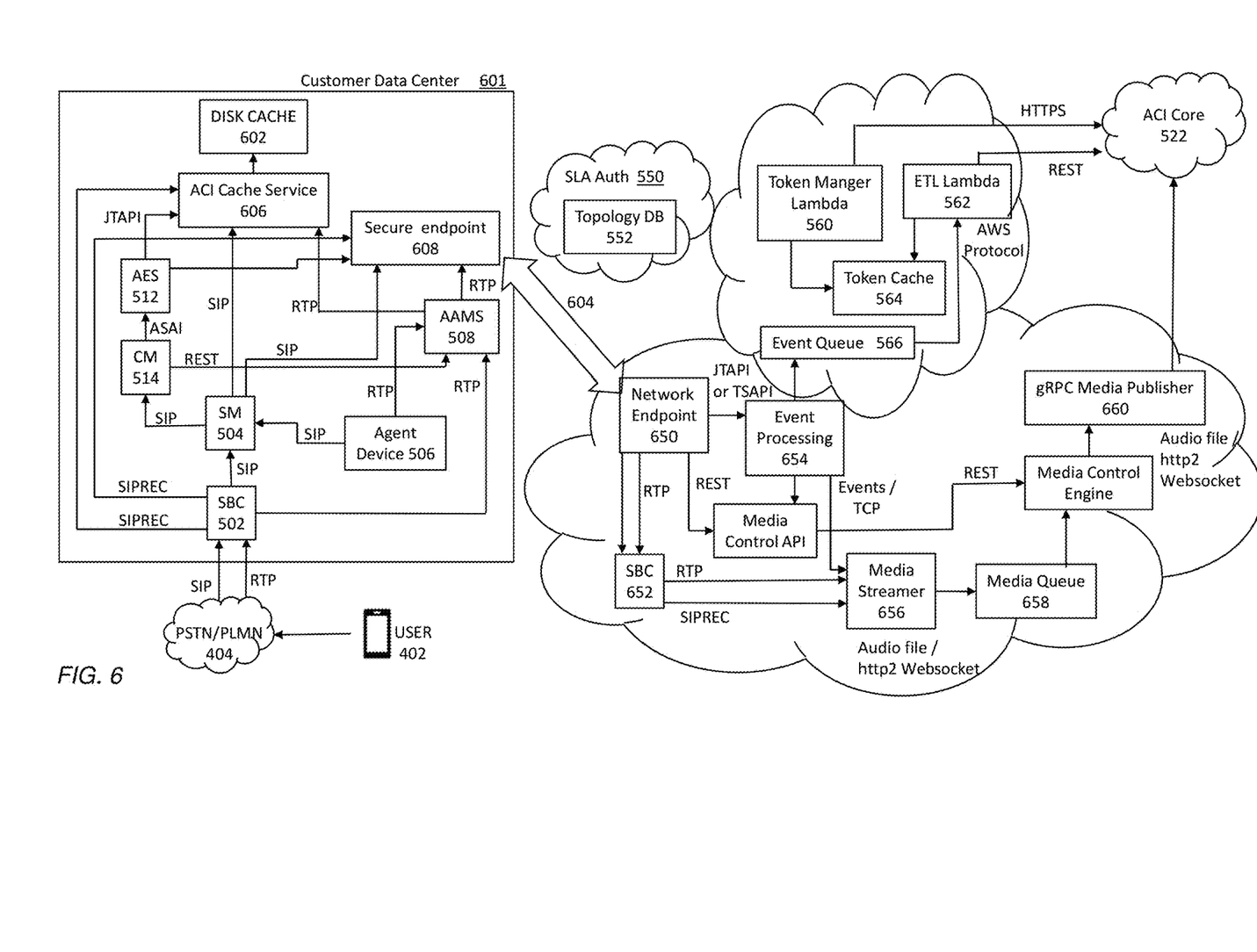
FIGS. 6 and 7 depict one example implementation using a secure communication channel of a hybrid transcription service in accordance with the principles of the present disclosure.

In the arrangement of FIG. 6, a VPN 604, or other secure communication channel, can be used from an endpoint 608 (e.g., VPN, AWS Direct Connect, or AWS Private Link) to communicate the media stream and associated events from the on-premises equipment to a cloud-based service. In case the cloud-based service cannot be reached, the arrangement of FIG. 6 can include an on-premises cache service 606 that uses a data storage device 602 to store the media streams and events for later processing. As such, a second SBC 652 and a media streamer 656 is located in the cloud rather than on-premises and the event processing functionality 654 is also located in the cloud much like the event processing module 524 of FIG. 5. The arrangement of FIG. 6 provides additional functionality with a gRPC media publisher 660, a media control engine, and a media queue 658 that allows redacting sensitive data from being transmitted to the ACI core 522. For example, social security numbers or credit card numbers may be redacted from the media sent to the ACI core 522 to be transcribed and analyzed.

Figure 7:
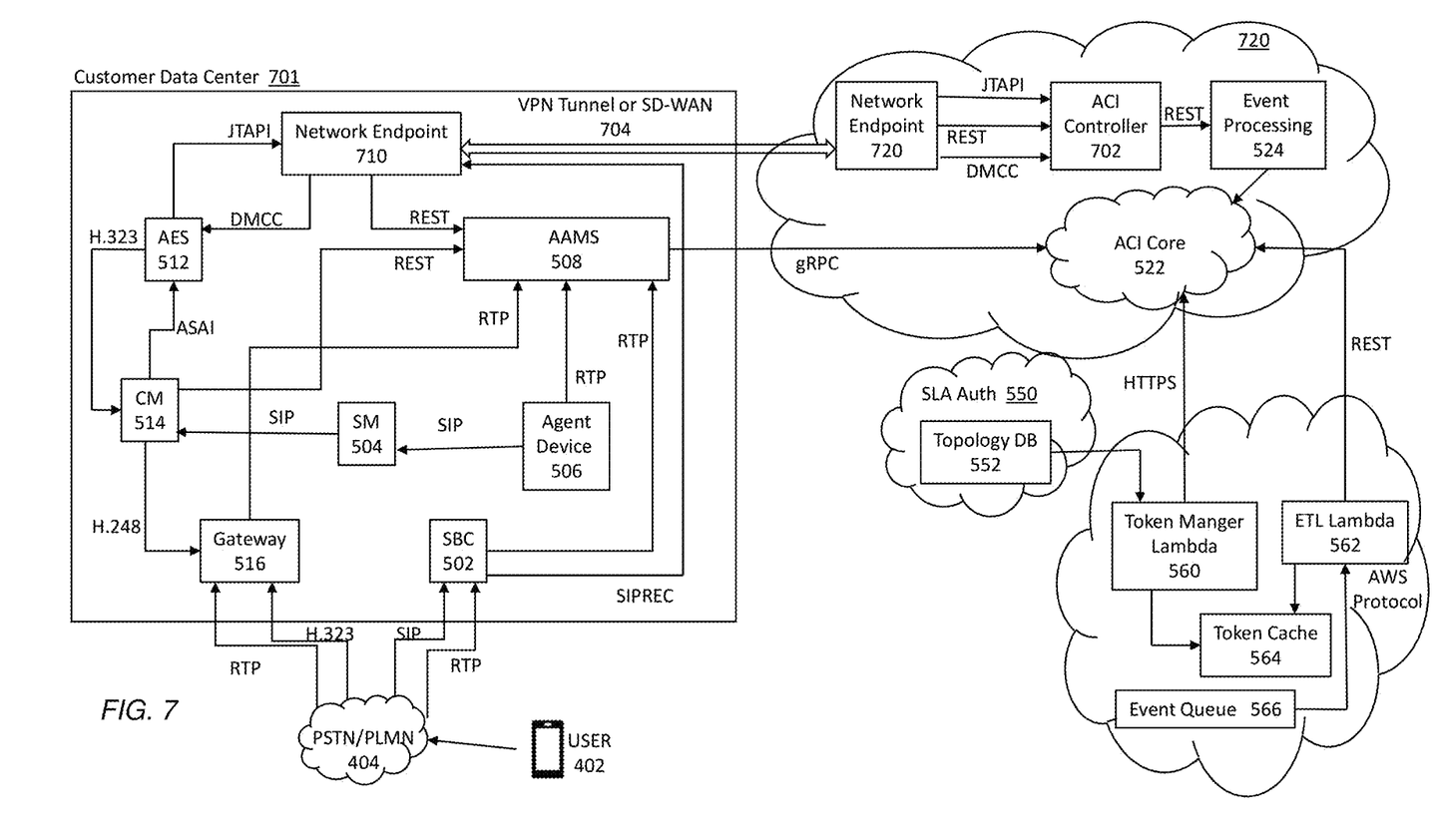

FIG. 7 depicts an arrangement substantially similar in many aspects to that of FIG. 5. However, in FIG. 7, the ACI controller 702 functionality is located within the cloud 720 and a network endpoint of a VPN 704, or other secure channel, is utilized to transmit event data from the on-premises 701 devices to the ACI controller 702 via a corresponding network endpoint 720. As would be readily recognized by one of ordinary skill, each media stream transmitted via gRPC (for example) would be identifiable in a manner to be easily associated with events that correspond to that stream in order that transcribing of portions of that stream can be controlled in accordance with the principles of the present disclosure.

Figure 8:
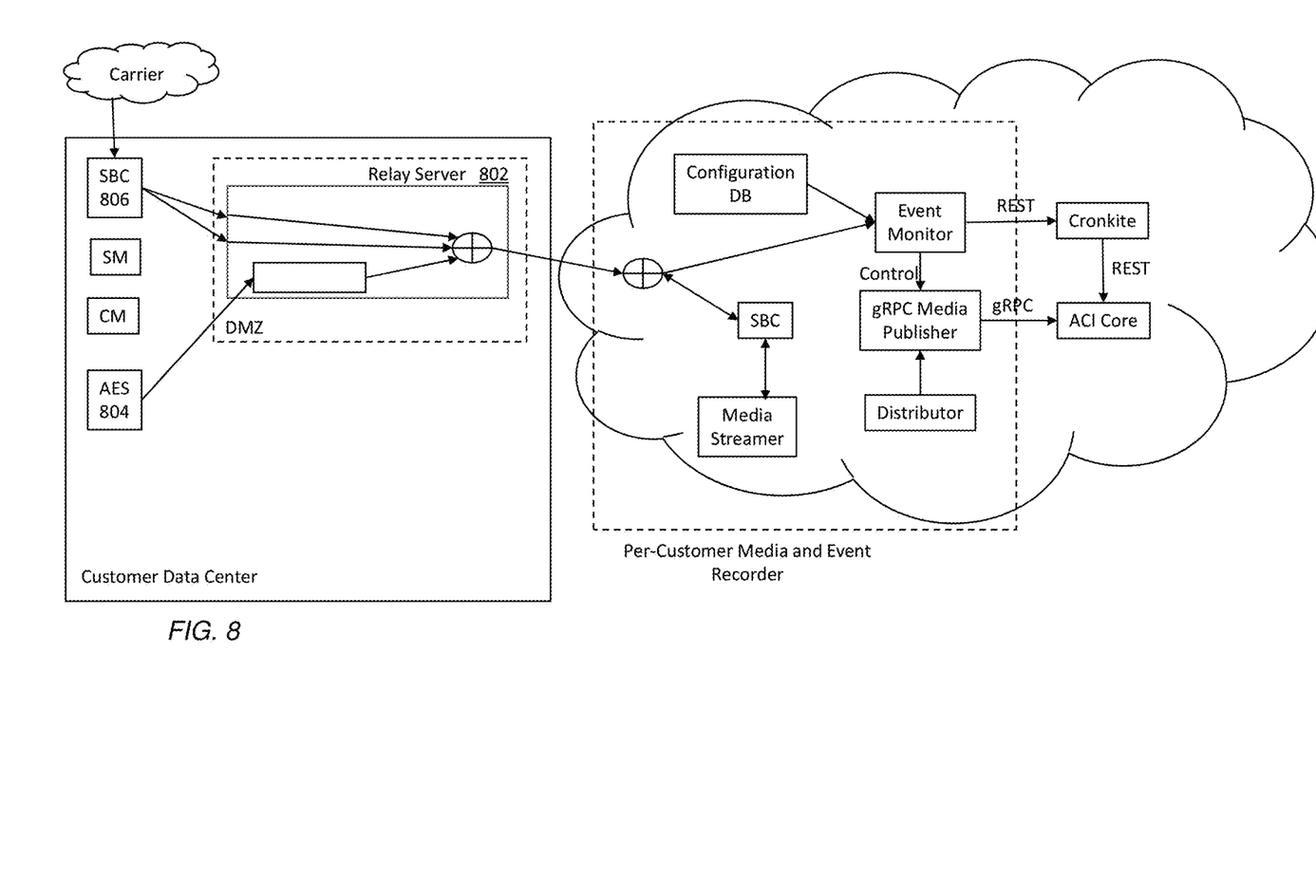
FIG. 8 and FIG. 9 illustrate one example implementation of a hybrid transcription service in accordance with the principles of the present disclosure.
Figure 9:
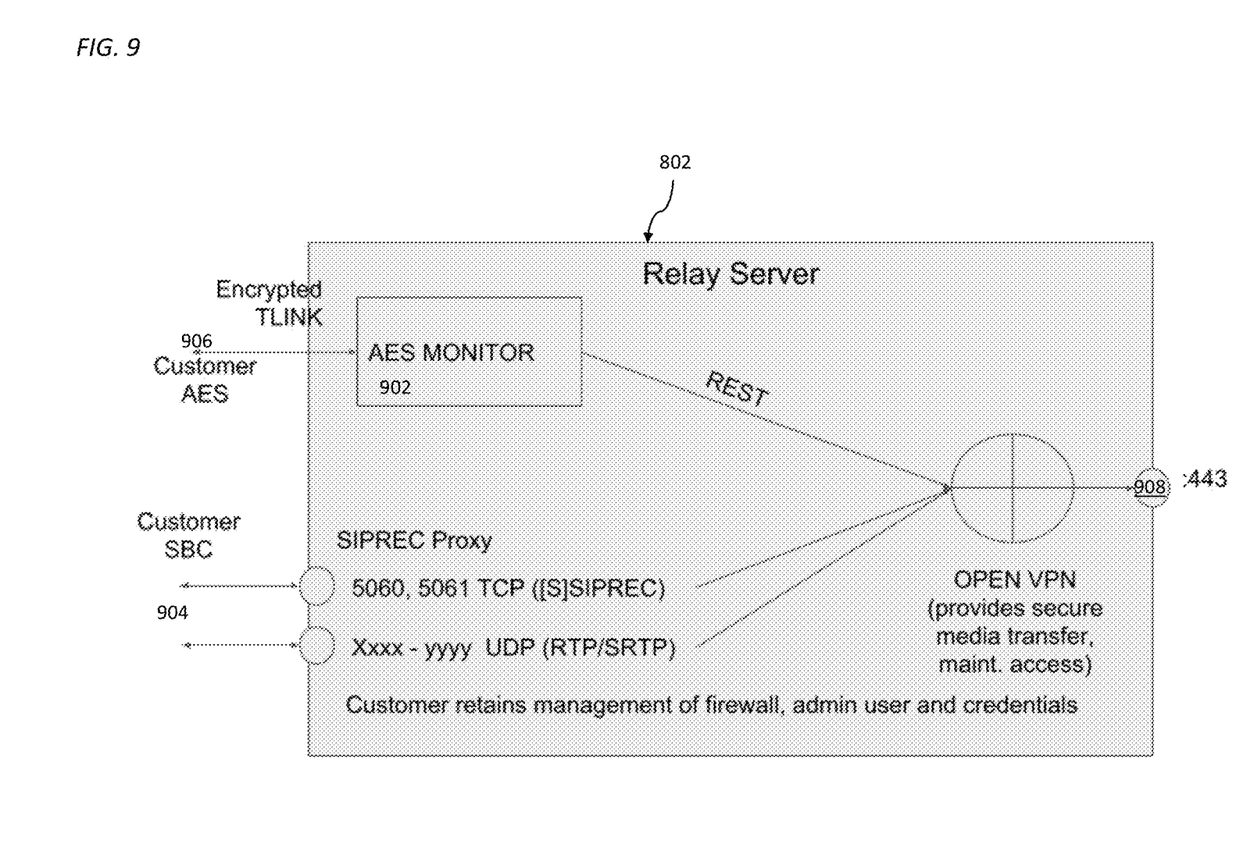

FIG. 8 and FIG. 9 illustrate one example implementation of a hybrid transcription service in accordance with the principles of the present disclosure. In FIG. 8, the enterprise 801, or on-premises equipment is connected to a cloud-based service 810 via a secure communication channel. The session border controller (SBC) 806 collects media stream data and SIP record messages from the on-premises devices. Additionally, the Application Enablement Services (AES) 804 collects respective event data associated with each media stream. A relay server 802 can be provided on premises that communicates this information to the cloud-based service 810. As described with respect to FIG. 6, for example, the cloud-based service 810 can include functionality 808 that processes each media stream and its associated event data to record the media stream and forward it to an ACI core 522 for processing and analysis.

Referring to FIG. 9, one example architecture of the relay server 802 is depicted. The media streams and SIP record message 904 are transmitted from the conventional on-premises equipment to the relay server 802. Additionally the conventional event data 904 associated with the media stream is also transmitted to the relay server 802. Using an AES monitor 902, the relay server can transmit the media stream, the SIP record message and the associated events through a secure channel such as HTTPS (e.g., port 443) to a cloud-based service. As described above, the cloud-based service can then selectively transcribe portions of the media stream based on the event data.

Thus, in accordance with the principles of the present disclosure a method and system for transcribing portions of a communication session between a user device and an on-premises device of an enterprise has been described. In particular, a computer located remotely from the on-premises device receives a media stream of the communication session from the on-premises device. The on-premises device can include for example, a conventional contact center system in which an enterprise handles incoming and outgoing contacts with live agent, automated agents, or other systems via a variety of media channels. The remotely located computer can, as described above, be part of a cloud-based system which the on-premises device communicates with via a network over one or more communication channels. Furthermore, the cloud-based computer receives at least one event (or data identifying the at least one event) associated with the media stream from the on-premises device. Based on the at least one event (or the data identifying the at least one event), the cloud-based computer determines a portion of the media stream to transcribe. Different events can, for example, be used to stop a transcription, start a transcription, or resume a transcription that has previously been stopped. Ultimately, the cloud-based computer transcribes the portion of the media stream based on that determination. The transcription can take place in real-time during the communication session and using existing systems, the transcribed portion can also be analyzed by an AI-based system to provide feedback to an agent, a supervisor, or other entity of the enterprise regarding the communication session. Additionally, even though the above description may have referred to "a media stream", the principles of the present disclosure are not limited to only a single media stream as one of ordinary skill will readily recognize that multiple media streams can originate from the contact center equipment as multiple contacts are handled concurrently. Furthermore, a contact center may have multiple tenants or customers, each generating multiple media streams to be processed in accordance with the principles of the present disclosure.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer-readable media having computer readable program code embodied thereon.

Any combination of one or more computer-readable media may be utilized. The computer-readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method for transcribing portions of a communication session between a user device and an on-premises device of an enterprise, the method comprising:
   receiving, by a computer located remotely from the on-premises device, a media stream of the communication session from the on-premises device;
   receiving, by the computer, at least one event associated with the media stream from the on-premises device, wherein the at least one event comprises a media and state change event, wherein the at least one event is received via a first communication channel and the media stream is received via a second communication channel;
   determining, by the computer, a portion of the media stream to transcribe based on the at least one event; and
   transcribing, by the computer, the portion of the media stream.

2. The method of claim 1, wherein the transcribing is performed in real-time.

3. The method of claim 1, comprising:
   providing, by the computer, access to the transcribed portion to an entity associated with the enterprise.

4. The method of claim 1, wherein the on-premises device and the computer are coupled via a network-based communication channel.

5. The method of claim 4, wherein the network-based communication channel comprises one of a HTTPS connection, a virtual private network (VPN), or a software-define WAN.

6. The method of claim 1, wherein the at least one event comprises one of Participant Enter, Participant Exit, Sub-conference created, Meeting Extended, Bot/Program Enter, Bot/Program Exit, Language Changed, or Personal Data Start/Stop.

7. The method of claim 1, wherein determining a portion of the media stream to transcribe based on the at least one event comprises determining to start transcribing.

8. The method of claim 1, wherein determining a portion of the media stream to transcribe based on the at least one event comprises determining to stop transcribing.

9. The method of claim 1, wherein determining a portion of the media stream to transcribe based on the at least one event comprises determining to resume transcribing.

10. A system for transcribing portions of a communication session between a user device and an on-premises device of an enterprise, the system remotely located from the on-premises device and comprising:
    a memory device, storing executable instructions; and
    a processor in communication with the memory device, the processor when executing the executable instructions:
       receives a media stream of the communication session from the on-premises device;
       receives at least one event associated with the media stream from the on-premises device, wherein the at least one event comprises a media and state change event, wherein the at least one event is received via a first communication channel and the media stream is received via a second communication channel;
       determines a portion of the media stream to transcribe based on the at least one event; and
       transcribes the portion of the media stream.

11. The system of claim 10, wherein the transcribing is performed in real-time.

12. The system of claim 10, the processor when executing the executable instructions:
    provides access to the transcribed portion to an entity associated with the enterprise.

13. The system of claim 10, wherein the on-premises device and the system are coupled via a network-based communication channel.

14. The system of claim 13, wherein the network-based communication channel comprises one of a HTTPS connection, a virtual private network (VPN), or a software-define WAN.

15. The system of claim 10, wherein the at least one event comprises one of Participant Enter, Participant Exit, Sub-conference created, Meeting Extended, Bot/Program Enter, Bot/Program Exit, Language Changed, or Personal Data Start/Stop.

16. The system of claim 10, wherein determining a portion of the media stream to transcribe based on the at least one event comprises determining to start transcribing.

17. The system of claim 10, wherein determining a portion of the media stream to transcribe based on the at least one event comprises determining to stop transcribing.

18. The system of claim 10, wherein determining a portion of the media stream to transcribe based on the at least one event comprises determining to resume transcribing.

\* \* \* \* \*